Figure 1:
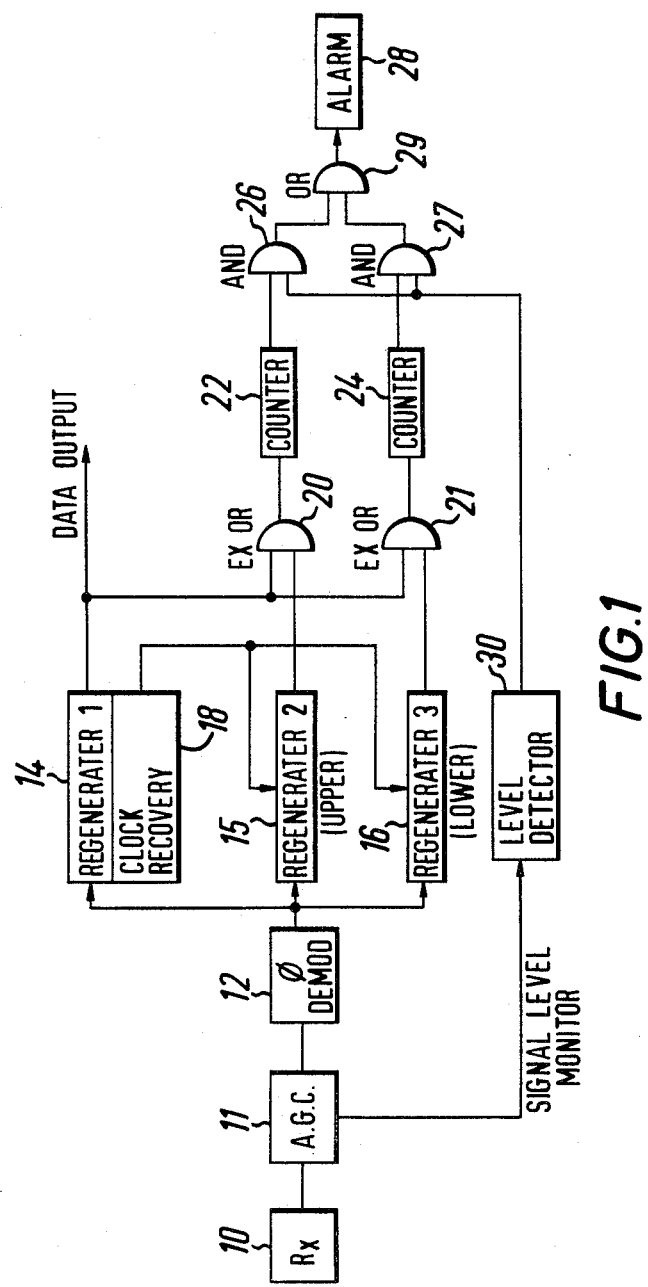

United States Patent [19]

Gilliland

[11] 4,327,356
[45] Apr. 27, 1982

[54] ARRANGEMENT FOR MONITORING THE PERFORMANCE OF A DIGITAL TRANSMISSION SYSTEM

[76] Inventor: John D. Gilliland, 63 Lockington Cresent, Stowmarket, Suffolk, England

[21] Appl. No.: 49,502

[22] Filed: Jun. 19, 1979

[51] Int. Cl.³ .......................... H04Q 9/00; H04J 3/14
[52] U.S. Cl. ............................... 340/825.77; 375/4; 328/162
[58] Field of Search ............... 340/172; 328/162, 148; 375/4

[56] References Cited

U.S. PATENT DOCUMENTS

| | | | |
|---|---|---|---|
| 3,404,232 | 10/1968 | Burford | 328/162 |
| 3,585,507 | 6/1971 | Bickel | 328/148 |
| 3,721,959 | 3/1973 | George | 328/162 |
| 3,777,268 | 12/1973 | Cleobury et al. | 328/148 |
| 3,873,775 | 3/1975 | Chown | 375/4 |
| 4,034,340 | 7/1977 | Sant'Agostino | 340/172 |

Primary Examiner—Donald J. Yusko
Attorney, Agent, or Firm—Larry S. Nixon

[57] ABSTRACT

A monitor for monitoring the performance of a digital transmission system has three level sensors for sensing at decision instants the level of a signal derived from a transmitted signal. A first of the level sensors has its threshold set at a level corresponding substantially to the eye diagram amplitude, a second has its threshold set near the upper level of the eye diagram amplitude, and the third has its threshold set near the lower level of the eye diagram amplitude. The outputs from the level sensors are connected to logic circuitry which is arranged to energize an alarm whenever the upper or lower eye amplitude level is between the thresholds of the second and third level sensors.

5 Claims, 4 Drawing Figures

ARRANGEMENT FOR MONITORING THE PERFORMANCE OF A DIGITAL TRANSMISSION SYSTEM

DESCRIPTION

This invention relates to monitoring the performance of a digital transmission system.

The performance of a digital radio system can be monitored by sensing the eye diagram amplitude. Any degradation of the system such as group delay, bandwidth limitation, or attenuation distortion, will appear as a decrease of the eye amplitude. In a typical digital receiver the output of a demodulator is sensed at particular instants in time in a level sensor which produces either binary "0" or binary "1" depending upon the level of the output of the demodulator. The threshold level of the level sensor is set at a value which corresponds substantially to the centre of the eye diagram amplitude.

We propose providing two further level sensors one of which has its threshold near the upper level of the eye diagram amplitude and the other of which has its threshold near the lower level of the eye diagram amplitude and means for producing an alarm signal when the upper or lower eye amplitude level is between the thresholds of the two further level sensors.

According to the present invention there is provided a monitoring arrangement for monitoring the performance of a digital transmission system comprising three level sensors for sensing at decision instants the level of a signal derived from a transmitted signal, a first of the sensors having its threshold corresponding substantially to the centre of the eye diagram amplitude, a second of the sensors having its threshold near the upper level of the eye diagram amplitude, the third of the sensors having its threshold near the lower level of the eye diagram amplitude, and means for producing an alarm signal when the upper or lower eye amplitude level is between the thresholds of the second and third level sensors.

The alarm signal producing means may include logic means for comparing the outputs of the second and third level sensors with the output of the first level sensor. The logic means may include first gate means arranged to receive the outputs of the first and second level sensors, second gate means arranged to receive the outputs of the first and third level sensors and resettable counting means for counting output pulses from said first and second gate means. The first and second gate means may comprise exclusive OR gates.

The monitoring arrangement may include means for monitoring the level of a received signal to provide a signal for disabling the alarm when the carrier to noise ratio of the received signal falls below a predetermined value.

Figure 2:
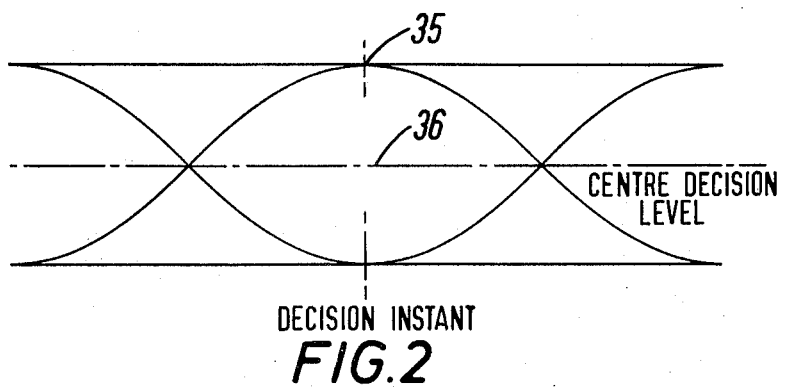
Figure 3:
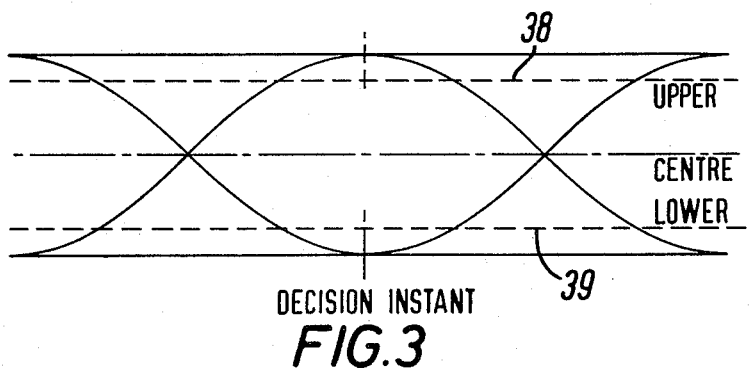
Figure 4:
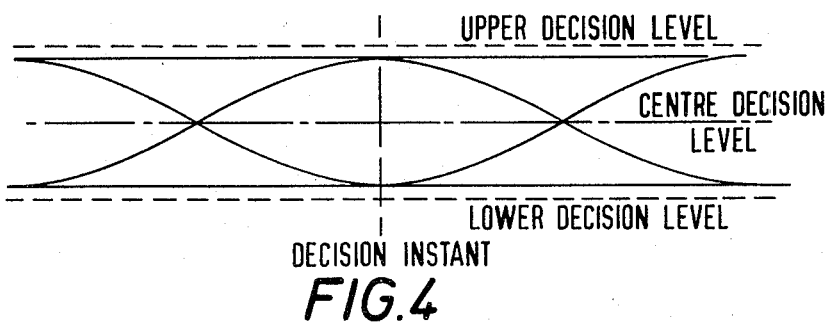

The invention will be described now by way of example only with particular reference to the accompanying drawings. In the drawings:

FIG. 1 is a block schematic diagram of an eye amplitude monitor in accordance with the present invention, and FIGS. 2 to 4 are waveform diagrams to illustrate the operation of the monitor.

The eye amplitude monitor shown in FIG. 1 has a receiver 10 which is arranged to receive radio frequency carrier signals on which are modulated digital signals. The receiver has an output which is connected via an automatic gain control circuit 11 to a demodulator 12. The demodulator 12 has an output which is connected to the input of each of three regenerator circuits 14, 15 and 16. The regenerator 14 constitutes a centre decision level sensor, the regenerator 15 an upper decision level sensor and the regenerator 16 a lower decision level sensor. The regenerator 14 has associated therewith a clock recovery circuit 18 and the clock signals derived from this clock recovery circuit are used to drive the regenerators 15 and 16. The output of the regenerator 14 constitutes the data output which is in the form of binary "0" or binary "1".

The output of the regenerators 15 and 16 are connected to one input of two exclusive OR gates 20, 21. The second input to the OR gates 20 and 21 is connected to the output of the regenerator 14. The output of each exclusive OR gate is connected to a resettable counter 22, 24 and the outputs of the counters are connected by AND gates 26, 27 and an OR gate 29 to an alarm 28.

The automatic gain control circuit 11 also has an output which is connected to a level detector 30. The output of the level detector is connected to a second input of the AND gates 26 and 27. The output from the automatic gain control circuit 11 to the level detector circuitry constitutes a signal level monitor.

The operation of the monitor will now be described with reference to FIGS. 2 to 4. An eye amplitude diagram is shown in FIG. 2 of the drawings. In a digital radio system the eye amplitude is a useful measure of the performance of the transmission link. Impairments of group delay, bandwidth limitations and attenuation distortion appear as a closing of the eye diagram amplitude. In a digital receiver of the type shown in FIG. 1 the output of the demodulator 12 is regenerated to obtain the data output by sampling the demodulator output at a point in time when the amplitude of the demodulator output is a maximum and comparing it with a threshold which is at the centre of the eye diagram amplitude to determine whether the output is a "1" or "0". This is illustrated in FIG. 2 and the decision instants are shown at 35. The centre decision level is illustrated by the dot dash line 36 and the regenerator 14 is set to sense whether the demodulator output is above or below this level.

The two additional regenerators 15 and 16 are used to sense when the amplitude of the waveform changes. The regenerator 15 has its decision level set at the position shown by the line 38 (FIG. 3) which is towards the upper level of the eye diagram amplitude and the regenerator 16 has its decision level set at the position indicated by the line 39 i.e. towards the lower level of the eye diagram amplitude.

The regenerators are so set that when the diagram amplitude is normal as shown in FIG. 3 the outputs of all three regenerators are the same i.e. all "1's" or all "0's". In this situation the outputs of the OR gates 20 and 21 are "0's". If a situation such as that shown in FIG. 4 occurs then if the centre decision level regenerator 14 produces a "1" output the upper decision level regenerator produces a "0" (or if the centre decision level regenerator indicates a "0" the lower decision regenerator will indicate a "1"). Thus by comparing the outputs of the three regenerators a change in the eye diagram amplitude can be detected. When either the upper or lower part of the eye diagram amplitude falls below its corresponding upper or lower decision level a "1" is obtained from the respective exclusive OR gate 20, 21. The outputs from the OR gates are entered into the respective counters 22, 24 which are cleared periodically. If one of the counters overflows before a clearing pulse arrives a monostable vibrator associated with the counter and with a time constant equal to the counter clearing frequency is triggered. The outputs of the monostable multi-vibrators associated with the counters 22, 24 are connected together with the output of the level detector 30 at the AND gates 26, 27. The output of the AND gates 26, 27 are connected to the OR gate 29 and the output of the OR gate is used to trigger the alarm 28 if the output of either counter 22, 24 overflows.

The connection from the automatic gain control circuit 11 via the level detector 30 is to prevent an alarm when there is a decrease in the carrier to noise ratio of a received signal as this could produce the same result as a decrease in high amplitude. By monitoring the carrier to noise ratio using the level detector 30 the alarm is disabled whenever the carrier to noise ratio falls below a certain value so that the alarm does not operate during a fade condition.

Most transmission degradations cause symmetrical closure of the eye diagram amplitude, but others cause asymmetrical closure (i.e. one half of the eye diagram degrades while the other half does not). It will be noted that in the arrangement shown in FIG. 1 the upper and lower decision level regenerators monitor the upper and lower halves of the eye diagram independently. Thus, it is possible to sense asymmetrical closures of the eye diagram with the present arrangement. It will also be noted that the monitor can distinguish between eye degradation due to low carrier to noise ratio and other degradations that degrade the eye diagram amplitude when the carrier to noise ratio is high.

I claim:

1. A monitoring arrangement for monitoring the performance of a digital transmission system based upon characteristics of the eye diagram of a received signal, said system comprising:

three level sensors for sensing, at decision instants, the level of a signal derived from said received signal, a first of the sensors having a threshold corresponding substantially to the center of the eye diagram amplitude, a second of the sensors having a threshold near the upper level of the eye diagram amplitude, and the third of the sensors having a threshold near the lower level of the eye diagram amplitude, means for producing an alarm signal when the upper or lower eye amplitude level is between the thresholds of the second and third level sensors, and means for monitoring the level of said received signal to provide a signal to said means for producing for inhibiting said alarm signal when the carrier-to-noise ratio of the received signal falls below a predetermined value.

2. A monitoring arrangement as in claim 1 wherein said means for producing an alarm signal includes logic means for comparing the outputs of the second and third level sensors with the output of the first level sensor.

3. A monitoring arrangement as in claim 2 wherein said logic means includes:

first gate means arranged to receive the outputs of the first and second level sensors, second gate means arranged to receive the outputs of the first and third level sensors, and a pair of resettable counting means, one for counting output pulses from each of said gate means, an alarm signal being produced when either counting means has counted a predetermined number of pulses.

4. A monitoring arrangement as in claim 3 wherein said first and second gate means comprise exclusive OR gates.

5. A monitoring arrangement as in claim 3 wherein the output of each counting means is connected to one input of a respective one of two AND gates, a second input to each AND gate being the output from said means for monitoring.

* * * * *

UNITED STATES PATENT AND TRADEMARK OFFICE
CERTIFICATE OF CORRECTION

PATENT NO. : 4,327,356

DATED : April 27, 1982

INVENTOR(S) : John D. Gilliland

It is certified that error appears in the above-identified patent and that said Letters Patent is hereby corrected as shown below:

On The Title Page insert,

-- (73) Assignee: Post Office, London, England --.

Signed and Sealed this

Twenty-sixth Day of October 1982

[SEAL]

Attest:

GERALD J. MOSSINGHOFF

Attesting Officer

Commissioner of Patents and Trademarks